United States Patent
Pannier et al.

(10) Patent No.: US 9,673,672 B2
(45) Date of Patent: Jun. 6, 2017

(54) INDIVIDUAL-SEGMENT ROTOR HAVING RETAINING RINGS

(71) Applicant: SIEMENS AKTIENGESELLSCHAFT, München (DE)

(72) Inventors: Lars Pannier, Rödelmaier (DE); Jürgen Pawellek, Unsleben (DE); Benjamin Volkmuth, Sulzthal (DE); Rolf Vollmer, Gersfeld (DE); Sebastian Waider, Petersberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 48 days.

(21) Appl. No.: 14/784,902

(22) PCT Filed: Aug. 27, 2013

(86) PCT No.: PCT/EP2013/067655
§ 371 (c)(1),
(2) Date: Oct. 15, 2015

(87) PCT Pub. No.: WO2014/169971
PCT Pub. Date: Oct. 23, 2014

(65) Prior Publication Data
US 2016/0087496 A1 Mar. 24, 2016

(30) Foreign Application Priority Data
Apr. 16, 2013 (EP) .................................. 13163926

(51) Int. Cl.
*H02K 1/27* (2006.01)

(52) U.S. Cl.
CPC .................................. *H02K 1/2773* (2013.01)

(58) Field of Classification Search
CPC ........ H02K 1/27; H02K 1/277; H02K 1/2773; H02K 21/12; H02K 21/14
(Continued)

(56) References Cited

U.S. PATENT DOCUMENTS 3,072,813 A * 1/1963 Donselaar ............ H02K 1/2773
310/156.55
4,339,874 A * 7/1982 Mc'Carty .............. H02K 1/278
29/598
(Continued)

FOREIGN PATENT DOCUMENTS

DE 699 236 C 11/1940
DE 10 2008 026 648 A1 12/2009
(Continued)

*Primary Examiner* — Tran Nguyen
(74) *Attorney, Agent, or Firm* — Henry M. Feiereisen LLC

(57) ABSTRACT

The aim is to propose an individual-segment rotor that is simple to construct and suitable for series production. Therefore, an individual-segment rotor having a plurality of laminated core segments (2) arranged in a star shape and a permanent magnet (1) between each pair of adjacent laminated core segments (2) is provided, whereby the laminated core segments and the permanent magnets are arranged in a hollow cylindrical assembly. The laminated core segments each have a plurality of individual sheets, which are rigidly connected to one another. The hollow cylindrical assembly has a groove on each of two outer edges, into which groove a ring (11) is inserted in order to fasten the assembly.

8 Claims, 3 Drawing Sheets

(58) Field of Classification Search
USPC ............ 310/156.08, 156.28, 156.29, 156.31,
310/156.45, 156.48, 156.55, 156.59,
310/156.61, 216.057, 216.017, 216.074,
310/216.079, 216.087, 216.096, 216.116,
310/216.121, 216.124
See application file for complete search history.

(56) References Cited

U.S. PATENT DOCUMENTS

| | | | |
|---|---|---|---|
| 4,700,097 A * | 10/1987 | Kawada | H02K 21/14 |
| | | | 310/156.45 |
| 5,091,668 A * | 2/1992 | Cuenot | H02K 1/2773 |
| | | | 310/156.61 |
| 5,111,094 A | 5/1992 | Patel | |
| 5,786,650 A | 7/1998 | Uchida | |
| 6,483,221 B1 | 11/2002 | Pawellek et al. | |
| 6,628,031 B2 | 9/2003 | Vollmer | |
| 6,768,238 B2 * | 7/2004 | Knauff | H02K 1/2773 |
| | | | 310/156.53 |
| 6,812,612 B2 | 11/2004 | Schunk et al. | |
| 6,858,965 B2 | 2/2005 | Mueller et al. | |
| 6,885,187 B2 | 4/2005 | Duenisch et al. | |
| 6,943,467 B2 | 9/2005 | Potoradi et al. | |
| 7,141,905 B2 | 11/2006 | Vollmer | |
| 7,202,582 B2 | 4/2007 | Eckert et al. | |
| 7,285,883 B2 | 10/2007 | Bott | |
| 7,564,158 B2 | 7/2009 | Huth | |
| 7,687,957 B2 * | 3/2010 | Ochiai | H02K 1/278 |
| | | | 310/156.08 |
| 7,692,356 B2 | 4/2010 | Bott et al. | |
| 7,705,507 B2 | 4/2010 | Vollmer et al. | |
| 7,709,984 B2 | 5/2010 | Braun et al. | |
| 7,732,967 B2 | 6/2010 | Vollmer et al. | |
| 7,755,315 B2 | 7/2010 | Bott et al. | |
| 7,777,373 B2 | 8/2010 | Bott et al. | |
| 7,859,160 B2 | 12/2010 | Vollmer | |
| 7,911,104 B2 * | 3/2011 | Ifrim | H02K 1/2773 |
| | | | 310/156.19 |
| 7,915,777 B2 | 3/2011 | Vollmer | |
| 7,977,826 B2 | 7/2011 | Vollmer et al. | |
| 8,022,580 B2 | 9/2011 | Budde et al. | |
| 8,026,640 B2 | 9/2011 | Bott et al. | |
| 8,063,517 B2 | 11/2011 | Bott et al. | |
| 8,115,360 B2 | 2/2012 | Vollmer | |
| 8,134,273 B2 | 3/2012 | Vollmer et al. | |
| 8,227,951 B2 | 7/2012 | Grossmann et al. | |
| 8,283,815 B2 | 10/2012 | Vollmer | |
| 8,378,541 B2 | 2/2013 | Vollmer | |
| 8,441,158 B2 | 5/2013 | Vollmer | |
| 8,564,166 B2 * | 10/2013 | Pan | H02K 21/16 |
| | | | 310/156.48 |
| 8,674,560 B2 | 3/2014 | Budde et al. | |
| 8,853,894 B2 | 10/2014 | Fick et al. | |
| 8,922,072 B2 | 12/2014 | Bott et al. | |
| 2006/0219880 A1 | 10/2006 | Braun et al. | |
| 2007/0040466 A1 | 2/2007 | Vollmer | |
| 2007/0114861 A1 | 5/2007 | Bott et al. | |
| 2007/0257566 A1 | 11/2007 | Vollmer | |
| 2007/0257575 A1 | 11/2007 | Vollmer | |
| 2008/0169718 A1 | 7/2008 | Schunk et al. | |
| 2008/0185931 A1 | 8/2008 | Platen et al. | |
| 2008/0289440 A1 | 11/2008 | Vollmer et al. | |
| 2008/0315704 A1 | 12/2008 | Vollmer | |
| 2009/0009114 A1 | 1/2009 | Schunk et al. | |
| 2009/0015080 A1 | 1/2009 | Vollmer et al. | |
| 2009/0096308 A1 * | 4/2009 | Staudenmann | H02K 1/2773 |
| | | | 310/156.08 |
| 2009/0152959 A1 | 6/2009 | Vollmer | |
| 2009/0160283 A1 | 6/2009 | Vollmer et al. | |
| 2009/0184602 A1 | 7/2009 | Braun et al. | |
| 2009/0251013 A1 | 10/2009 | Vollmer et al. | |
| 2009/0285517 A1 | 11/2009 | Eckel et al. | |
| 2009/0302832 A1 | 12/2009 | Budde et al. | |
| 2009/0315424 A1 | 12/2009 | Vollmer | |
| 2010/0000830 A1 | 1/2010 | Budde et al. | |
| 2010/0013333 A1 | 1/2010 | Vollmer | |
| 2010/0133940 A1 | 6/2010 | Grossmann et al. | |
| 2010/0264770 A1 | 10/2010 | Braun et al. | |
| 2012/0025654 A1 | 2/2012 | Bach et al. | |
| 2012/0038237 A1 * | 2/2012 | Li | H02K 1/146 |
| | | | 310/156.45 |
| 2012/0181880 A1 * | 7/2012 | Zhao | D06F 37/30 |
| | | | 310/43 |
| 2013/0127264 A1 | 5/2013 | Fick et al. | |
| 2013/0147285 A1 | 6/2013 | Vollmer et al. | |
| 2013/0241324 A1 | 9/2013 | Mader et al. | |
| 2013/0241335 A1 | 9/2013 | Vollmer | |
| 2013/0241338 A1 | 9/2013 | Mader et al. | |
| 2013/0249340 A1 | 9/2013 | Potoradi et al. | |
| 2014/0028135 A1 | 1/2014 | Vollmer et al. | |
| 2014/0042857 A1 | 2/2014 | Mader et al. | |
| 2014/0070655 A1 | 3/2014 | Schneider et al. | |
| 2014/0097782 A1 | 4/2014 | Vollmer | |
| 2015/0233421 A1 | 8/2015 | Bott et al. | |

FOREIGN PATENT DOCUMENTS

| | | |
|---|---|---|
| EP | 0 104 830 A1 | 4/1984 |
| EP | 0 549 430 A1 | 6/1993 |
| EP | 1 657 801 A2 | 5/2006 |
| EP | 2 639 935 B1 | 3/2012 |

\* cited by examiner

INDIVIDUAL-SEGMENT ROTOR HAVING RETAINING RINGS

CROSS-REFERENCES TO RELATED APPLICATIONS

This application is the U.S. National Stage of International Application No. PCT/EP2013/067655, filed Aug. 27, 2013, which designated the United States and has been published as International Publication No. WO 2014/169971 and which claims the priority of European Patent Application, Serial No. 13163926.2, filed Apr. 16, 2013, pursuant to 35 U.S.C. 119(a)-(d).

BACKGROUND OF THE INVENTION

The present invention relates to an individual-segment rotor having a plurality of laminated core segments arranged in a star shape, wherein the laminated core segments each have a plurality of individual sheets, which are firmly connected to one another and each having a permanent magnet between each pair of adjacent laminated core segments, through which a hollow-cylindrical arrangement of the laminated core segments and the permanent magnets is produced.

The rotors of electric motors and generators can be constructed as individual-segment rotors. In such cases the permanent magnets are arranged in a star shape around the shaft and a laminated core segment is located in each case in the spaces between each pair of adjacent permanent magnets. The aim is to construct such an electric motor or generator with magnets in a flux concentration having as little stray flux as possible. In addition the layout and the manufacturing should be suitable for series production. If necessary the rotor should also be constructed magnetically and mechanically concentric and symmetrical to the stator. In such cases it would also be useful for the air gap volume between rotating and stationary parts to be as small as possible.

It is known (cf. the subsequently published European patent application EP 12 159 917.9) that a bandage, which extends over the entire active part length of the rotor, can be used to take up the centrifugal forces of the laminated core segments and the permanent magnets. The tolerances effective in relation to the air gap will turn out rather large by virtue of the individual part tolerances and the material thickness of the bandage. Specifically in this layout the external diameter is defined via a chain of tolerances of four components (polygon shaft, magnet, laminated core segment and bandage). The bandage itself increases the gap between rotor and stator.

SUMMARY OF THE INVENTION

The present invention is thus based on the object to provide an individual-segment rotor, which is easy to produce, and makes a reduced air gap volume possible.

In accordance with the invention this object is achieved by an individual-segment rotor having a number of laminated core segments disposed in a star shape, wherein the laminated core segments each have a plurality of individual sheets which are connected firmly to one another, and having a permanent magnet between each pair of laminated core segments, through which a hollow-cylindrical arrangement of the laminated core segments and the permanent magnets is produced, wherein the hollow-cylindrical arrangement has a groove in each case on both outer edges, and a ring for fixing the arrangement is inserted into each groove.

In an advantageous manner the individual-segment rotor thus has a groove in each case on both outer edges into each of which a ring is inserted for fixing the arrangement. Thus a simple fixing of the arrangement by the rings is possible and the air gap can be reduced in the center by the rings for fixing only being provided at the edge.

Preferably the ring-shaped arrangement of the laminated core segments and permanent magnets is supported on its inside by an inner sleeve. The inner sleeve on the inside and the rings on the outside thus produce a stable ring-shaped or hollow-cylindrical arrangement.

The inner sleeve should be made of an "amagnetic" material (permeability number $\mu_r$ of less than 5). A magnetic short circuit between adjacent permanent magnets is thus suppressed in practice.

The individual sheets of each laminated core segment can be connected to one another by welding, hard soldering or gluing. Basically however they can be connected to one another in any other way by means of a material-to-material bond, a form fit or a force fit. However the techniques specifically mentioned make series production easier.

In addition the individual sheets of each laminated core segment can be punch packaged. In this method the sheets are already packaged onto one another during punching. This enables the level of automation to be increased.

The arrangement of the laminated core segments and permanent magnets can likewise have a groove on the outer surface in its axial center in each case, into which a further ring is inserted. This enables additional stabilization to be created if the individual-segment rotor is axially comparatively long.

Furthermore, continuing axially from the arrangement and coaxial with said arrangement, a further similar arrangement of laminated core segments and permanent magnets likewise fixed with rings can be arranged, wherein a common, one-piece ring is inserted into the grooves which adjoin each other from the two arrangements. The common ring not only has the function of fixing the components of the arrangement radially but also the function of fastening the two arrangements axially to each other.

The laminated core segments and permanent magnets of the arrangement can also be glued to one another and glued jointly to a shaft. An inherently stable arrangement is obtained by the gluing.

In accordance with a further embodiment the rings are only in contact with all permanent magnets of the arrangement. This has the advantage that a defined force can be exerted in the radial direction on all permanent magnets.

Furthermore the laminated core segments of the arrangement can be held in a form fit against their centrifugal force on the permanent magnets. Thus, while the permanent magnets are held by the rings in the radial direction, the laminated core segments are supported on the permanent magnets in the radial direction. This support does not influence the retaining force which is exerted by the rings on the permanent magnets.

In such cases each laminated core segment can have a foot extending partly or over the entire axial length of the arrangement, which increases in width towards its lower side, wherein at least one of the adjoining permanent magnets presses on the foot while making a form fit. Through the foot which widens downwards (i.e. towards the axis of the rotor) the centrifugal force of the respective laminated core segment is thus transferred to the adjacent permanent magnets. The laminated core segment is thus adequately fixed radially towards the outside.

BRIEF DESCRIPTION OF THE DRAWING

The present invention will now be explained in greater detail with reference to the enclosed drawings, in which.

DETAILED DESCRIPTION OF PREFERRED EMBODIMENTS

The exemplary embodiments outlined below in greater detail represent preferred forms of embodiment of the present invention.

Figure 1:
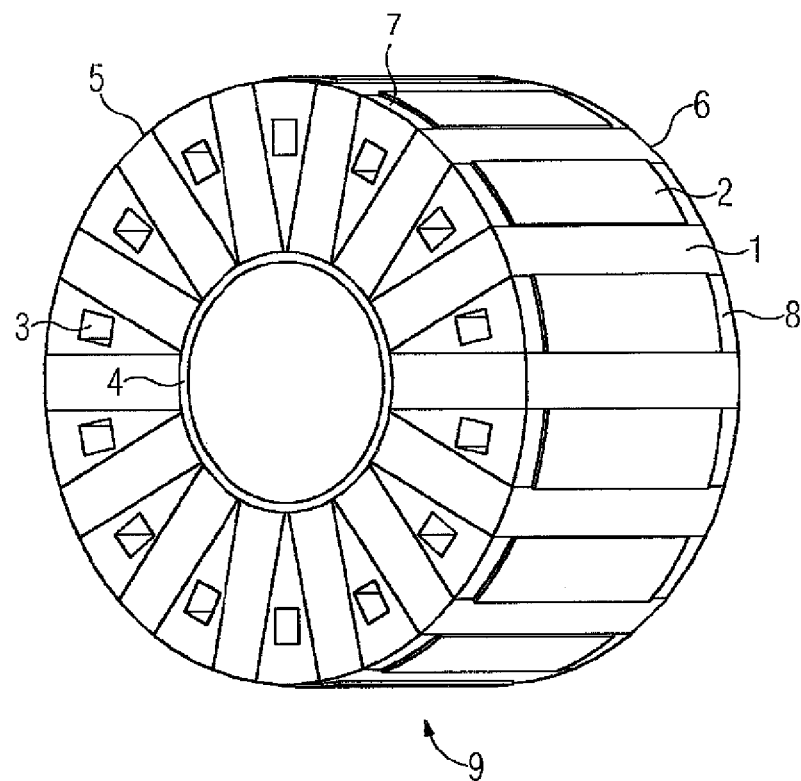
FIG. 1 shows a perspective view of an arrangement of laminated core segments and permanent magnets of an individual-segment rotor.

FIG. 1 shows an individual-segment rotor before production. The individual-segment rotor possesses an arrangement of permanent magnets 1, which are arranged in a star shape in relation to the axis of the individual-segment rotor, and laminated core segments 2 which are arranged in the spaces between two permanent magnets 1 in each case. The fact that each permanent magnet 1 is embodied in the shape of a plate or a cube produces segment-type sections between the permanent magnets 1, which are filled out by the laminated core segments 2.

The laminated core segments each includes a package of individual sheets, which are connected to one another by axial connecting elements 3.

The arrangement of laminated core segments 2 and permanent magnets 1 is hollow-cylindrical or ring-shaped and possesses an inner sleeve 4 on its inside, on which the arrangement is radially supported.

Furthermore the ring-shaped arrangement of the permanent magnets 1 and the laminated core segments 2 possesses two outer edges 5 and 6, which each form an edge between outer surface and relevant end face side. A groove 7, 8 is inserted into the outer surface of the ring-shaped arrangement along each outer edge.

Figure 2:
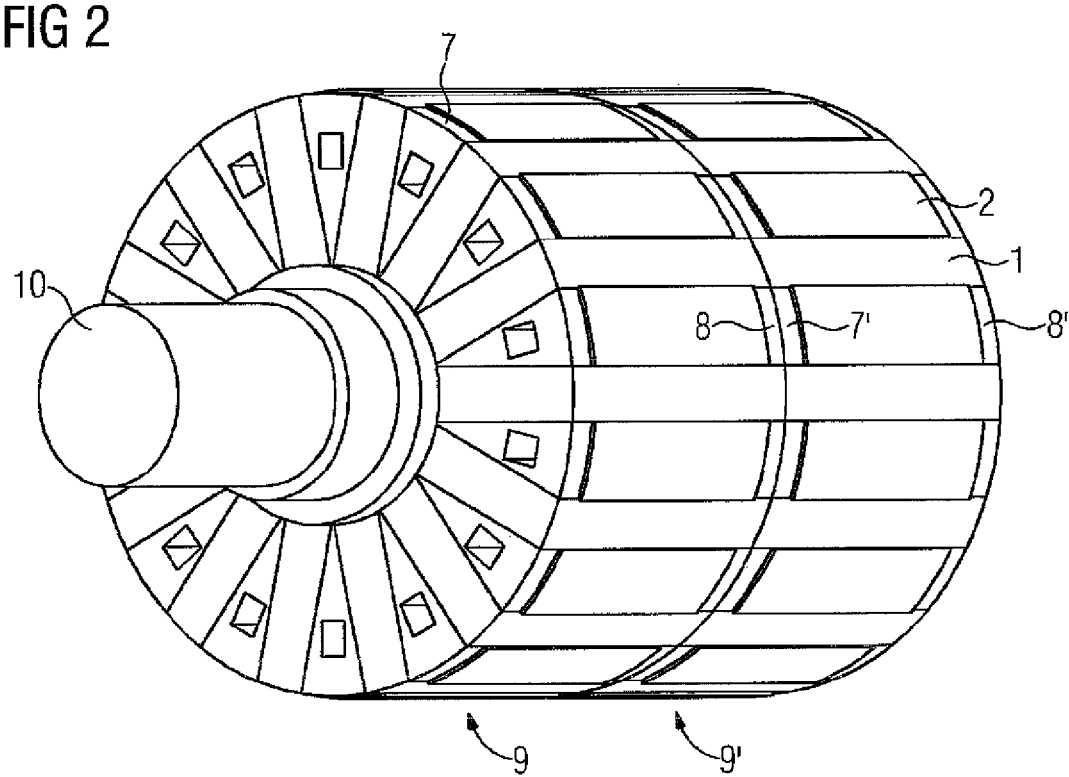
FIG. 2 shows the arrangement of FIG. 1 mounted on a shaft.

The intermediate product shown in FIG. 1 can be seen as a module, wherein an individual-segment rotor can be constructed with one or more of these types of module. In the example of FIG. 2 two such modules 9, 9' are arranged axially behind one another on a shaft 10. The two modules 9, 9' are thus located coaxially on the shaft 10. The two modules 9, 9' are of identical construction.

The groove 8 on the right-hand edge of the left-hand module 9 directly adjoins the left-hand groove 7' of the right-hand module 9'. Thus the two grooves 8 and 7' form one wide merged groove comprised of the two grooves.

Figure 3:
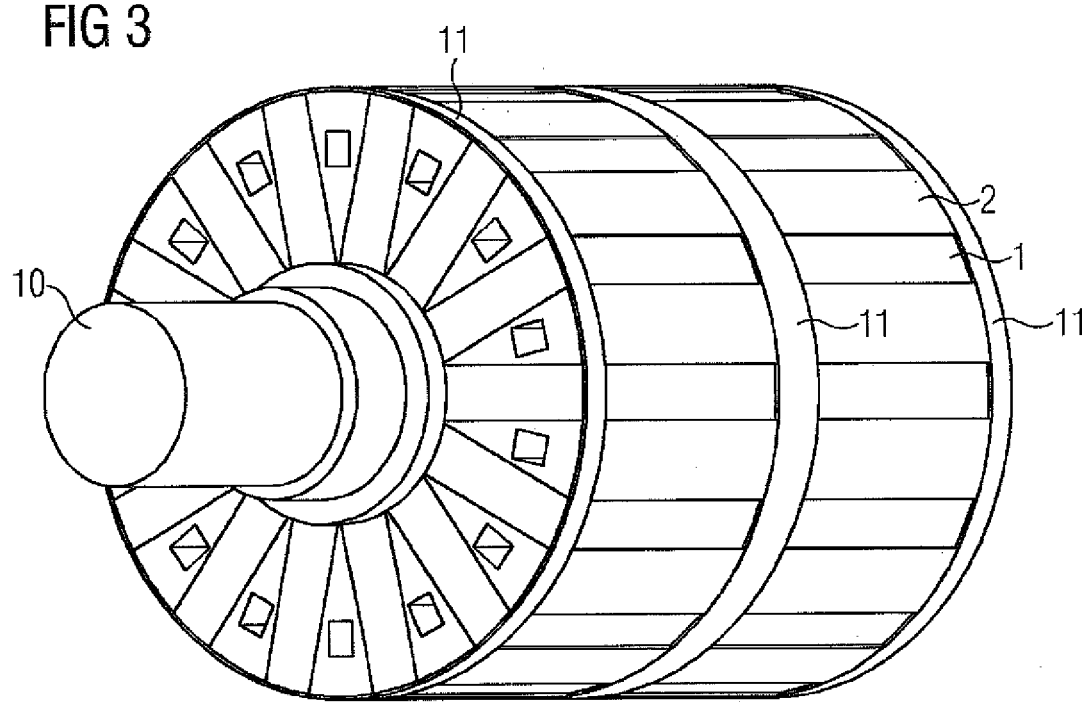
FIG. 3 shows the device of FIG. 2 with attached bandage rings.

In accordance with FIG. 3 bandage rings labeled 7' and 8' (for short rings 11) are inserted into the grooves 7, 8, which hold the arrangement of permanent magnets and laminated core segments 2 radially against the centrifugal force. The ring 11 in the wide groove 8, 7' is correspondingly wider than the rings in the grooves 7 and 8'.

If necessary the arrangement of permanent magnets 1 and laminated core segments 2 can also be a non-modular structure, namely with correspondingly long permanent magnets and equally long laminated core segments 2. In this case too it is useful under some circumstances to provide a groove in the axial center of the arrangement and to insert a bandage ring into said groove, in order to thus stabilize the individual-segment rotor better in center.

A low-scatter construction of the individual-segment rotor is achieved by the laminated core segments 2, which collect the magnetic flux of a pole, not having any soft-metal connection to the flux collectors of other poles and by the magnets 1, on the side facing towards the shaft 10, being positioned close to one another (i.e. having a minimum spacing from one another on the inner sleeve 4), which produces an almost star-shaped layout. The concentric symmetrical position of the magnetic poles on the rotor is achieved by gluing the magnets 1 to the shaft 10 and the laminated core segments 2 with adhesive which compensates for tolerances.

The ring-shaped bandage elements or rings 11, which do not extend over the entire active part length (entire axial extent of the individual-segment rotor) are used to take up the centrifugal forces. The rings 11 are located, as mentioned, in the grooves 7, 8, 7', 8' on the circumference of the arrangement.

The soft-magnetic laminated core segments 2 for flux collection includes individual sheets, which are connected axially to one another by a material-to-material bond, a form fit or a force fit. Small welded or hard soldered seams, punch-packages, adhesive connections of pressings are especially suitable.

To reduce the scattering the inner sleeve 4, which preferably is made of an amagnetic material (permeability number $\mu_r$ of less than 5), can be provided. With this inner sleeve the option of axial staggering of the modules and simple assembly is also provided.

With the ring-shaped bandage elements (rings 11) running in the annular grooves 7, 8; 7', 8', which are axially shorter than the active part length (<50%) a small central air gap can be realized. This produces a greater induction and thus a greater torque or a shorter length of the individual-segment rotor.

The gluing of the magnets to the segments and the gluing of the magnets to the shaft with adhesive which compensates for tolerances simplifies production and gives high accuracy for concentricity and pole symmetry, through which pendulous torque, noise generation and vibration excitation are reduced. A further reduction of the pendulous torque can be achieved with a modular structure of the individual-segment rotor, by the individual modules being rotated by a certain angle in relation to one another.

Figure 4:
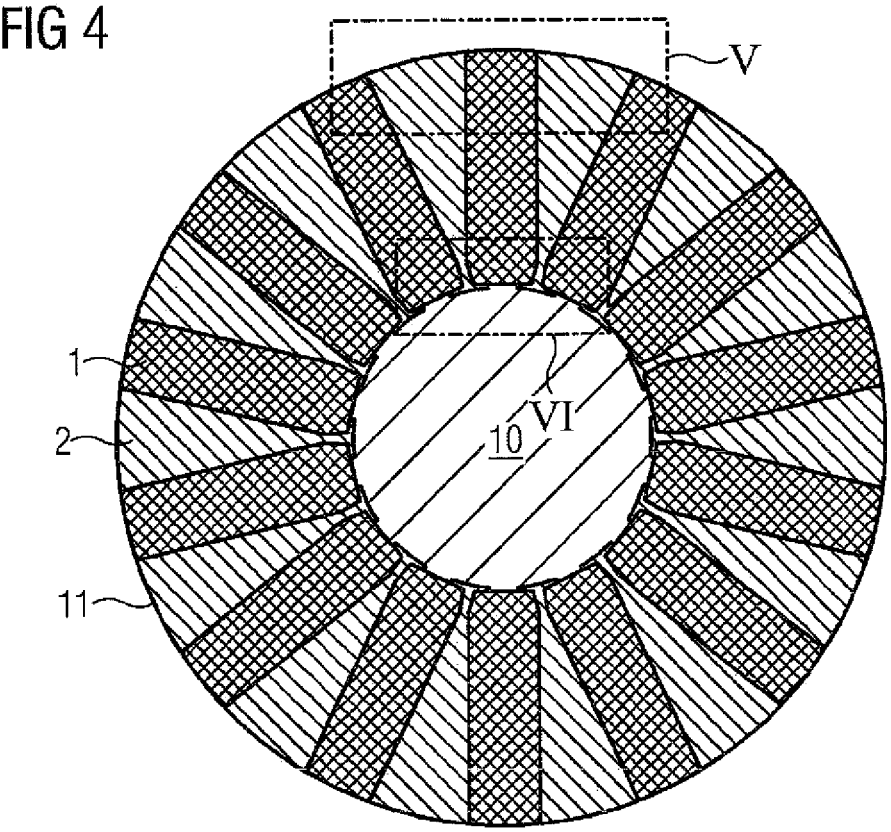
FIG. 4 shows a cross-sectional view of the individual-segment rotor of FIG. 3.
Figure 5:
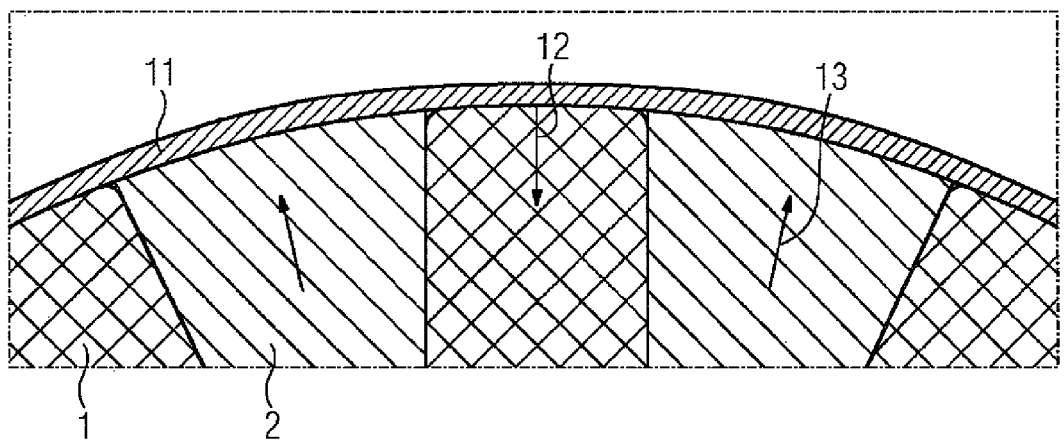
FIG. 5 shows an enlarged view of an outer area of the cross-section of FIG. 4
Figure 6:
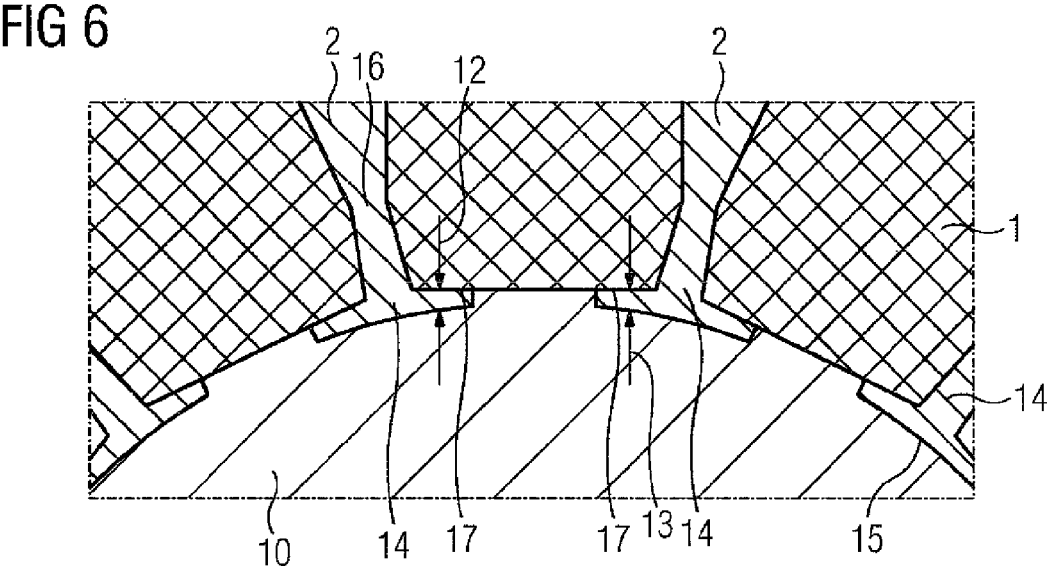
FIG. 6 shows an enlarged view of an inner section of the cross-section of FIG. 4.

FIGS. 4 to 6 relate to a further form of embodiment of the present invention. The cross-section of FIG. 4 through the individual-segment rotor shows the star-shaped arrangement of permanent magnets 1 with the shaft 10 in the center. The laminated cores 2 are located between the permanent magnets 1. The arrangement of the permanent magnets 1 and the laminated cores 2 is surrounded by a ring 11. In a perspective view the individual-segment rotor can look like the one depicted in FIG. 3.

FIG. 5 shows an outer section V of FIG. 4 enlarged. The groove to accept the bandage or the ring 11 in the laminated core segments 2 extends through to below the upper edge of the permanent magnets 1. Thus the bandage or the ring 11 is at least in contact with all permanent magnets 1. Whether the ring is also in contact with a laminated core segment 2 is not of importance here.

The ring 11 thus exerts a predetermined tensioning force 12 on the permanent magnets 1, which is directed radially inwards. This is countered by centrifugal forces 13 arising in the laminated core segments, which are directed radially outwards. Naturally corresponding centrifugal forces directed radially outwards, which are taken up directly by the ring 11 however, which is actually directly in contact with the permanent magnets, also arise in the permanent magnets. The centrifugal forces 13 of the laminated core segments 2 are however largely or exclusively transferred in the base area of the laminated core segments 2, which faces towards the shaft 10, to the permanent magnets 1.

To this end, FIG. 6 shows an inner section VI of FIG. 4.

It can be seen that the laminated core segments 2, at the end assigned to the shaft 10, each possess a foot 14. The lower side 15 of the foot 14 is considerably wider (in the circumferential direction) than its narrowest point 16. On both sides of the laminated core segment 2 the neighboring permanent magnets 1 are in direct contact. They thus come closest in the area of the narrowest point 16 (likewise related to the circumferential direction). The fact that the underside of the foot 14 is considerably wider than the narrowest point 16 means that a form fit is produced for the laminated core segment 2, which holds it against the centrifugal force 13 between the permanent magnets 1. The centrifugal force 13 is compensated for by the tensioning force 12. The forces are transmitted from the laminated core segments 2 to the permanent magnets 1 in the area of the feet 14, which form a support 17 for the magnets 1. The permanent magnets 1 are thus used as flexible carriers for radial fixing of the laminated core segments 2. In this way there is a constant load take-up of the radial forces at the permanent magnets 1.

A smallest possible air gap between a stator and the individual-segment rotor can be achieved by the bandage rings 11 being used, which lie in the grooves (cf. FIGS. 1 and 2) and thus do not contribute to the eternal diameter. In addition the fact that the sheets are in contact by their feet 14 (not the magnets 1) in a defined manner with the shaft 10 and thus only the shaft 10 and the laminated core segments 2 define the outer diameter, also allows a reduction of the air gap.

In accordance with the invention a number of features are thus combined. With the ring-shaped bandage insert elements 11, which are axially shorter than the active part length (<50%), running in the annular grooves a smaller central air gap can be realized. This produces a greater induction and thus a greater torque or a shorter length.

So that all individual sheets are held radially, they no longer have to be axially connected by punch-packaging for example. The permanent magnets, which act as flexible carriers, assume this task. This enables corresponding fixing elements for axial fixing to be dispensed with, which makes possible recesses in the laminated core segments, with which the inertia is able to be reduced.

An adhesive layer between shaft and permanent magnets is no longer necessary, but can be provided as an option. The definition of the shape and position of the entire rotor by means of components with very close tolerances (turned and milled shaft, punched lamination segments) makes for simple production and high accuracy for concentricity and pole symmetry, through which pendulous torque, noise generation and excitation of vibrations are reduced.

What is claimed is:

1. An individual-segment rotor, comprising:
 a plurality of laminated core segments arranged in a star shape, said laminated core segments each having a plurality of individual sheets which are firmly connected to one another;
 a plurality of permanent magnets, each of the permanent magnets being disposed between a corresponding pair of adjacent laminated core segments, thereby establishing a first hollow-cylindrical arrangement of the laminated core segments and the permanent magnets, with the laminated core segments being held on the permanent magnets by a form fit in opposition to a centrifugal force, each laminated core segment having a foot having a lower side and sized to extend over an entire axial length of the hollow-cylindrical arrangement and to increase in width in a direction towards the lower side, with at least one of an adjoining one of the permanent magnets pressing on the foot while making the form fit, said first hollow-cylindrical arrangement of the laminated core segments and the permanent magnets having two outer edges, each said edge being formed with a groove; and
 a ring inserted into the groove for fixing the arrangement such as to be solely in contact with the permanent magnets.

2. The individual-segment rotor of claim 1, further comprising an inner sleeve configured to support the first hollow-cylindrical arrangement of the laminated core segments and the permanent magnets in an inside thereof.

3. The individual-segment rotor of claim 2, wherein the inner sleeve is made of a magnetic material.

4. The individual-segment rotor of claim 1, wherein the individual sheets of each laminated core segment are connected to one another by welding, hard soldering or gluing.

5. The individual-segment rotor of claim 1, wherein the individual sheets of each laminated core segment are punch-packaged.

6. The individual-segment rotor of claim 1, wherein the first hollow-cylindrical arrangement of the laminated core segments and the permanent magnets that has an outer surface formed with a groove in an axial center of the outer surface, and further comprising a further ring inserted in the groove of the outer surface.

7. The individual-segment rotor of claim 1, further comprising a second hollow-cylindrical arrangement of laminated core segments and permanent magnets that is substantially same as structure of the first hollow-cylindrical arrangement of the laminated core segments and the permanent magnets, wherein said second hollow-cylindrical arrangement of the laminated core segments and the permanent magnets is disposed in axially adjoining and coaxial relationship to the first hollow-cylindrical arrangement of the laminated core segments and the permanent magnets; and a mutual one-piece ring inserted into the grooves of the first and second hollow-cylindrical arrangements of the laminated core segments and the permanent magnets.

8. The individual-segment rotor of claim 1, further comprising a shaft, wherein the first hollow-cylindrical arrangement of the laminated core segments and the permanent magnets with the laminated core segments and the permanent magnets thereof being glued to one another and glued jointly to the shaft.

\* \* \* \* \*